United States Patent [19]
Veltman et al.

[11] Patent Number: 5,456,092
[45] Date of Patent: Oct. 10, 1995

[54] ROTARY COOLING VESSEL WITH BAFFLE WITH HOLES

[75] Inventors: Joost Veltman, Aptos; Andrew C. Prins, Madera, both of Calif.

[73] Assignee: FMC Corporation, Chicago, Ill.

[21] Appl. No.: 257,763

[22] Filed: Jun. 9, 1994

[51] Int. Cl.⁶ .............................. F25D 17/02; F25D 25/02
[52] U.S. Cl. ..................... 62/381; 62/63; 62/64; 62/374; 62/375
[58] Field of Search .................... 62/63, 64, 374, 62/375, 381

[56] References Cited

U.S. PATENT DOCUMENTS

| | | | |
|---|---|---|---|
| 1,892,224 | 12/1932 | Sorber | 62/381 X |
| 2,116,738 | 5/1938 | Zarotschenzeff | 62/381 X |
| 2,200,331 | 5/1940 | Fisher | 62/381 X |
| 2,284,270 | 5/1942 | Eberts et al. | 62/381 X |
| 2,478,465 | 8/1949 | Dodson | 62/381 |
| 2,794,326 | 6/1957 | Mencacci | 62/63 |
| 3,029,616 | 4/1962 | Beevis | 62/381 |
| 3,286,477 | 11/1966 | Adams | 62/63 |
| 3,395,549 | 8/1968 | Grimes | 62/381 X |
| 4,875,344 | 10/1989 | Zittel | 62/381 |
| 5,329,842 | 7/1994 | Zittel | 62/381 X |

FOREIGN PATENT DOCUMENTS

| | | | |
|---|---|---|---|
| 72478 | 10/1948 | Denmark | 62/381 |
| 166430 | 12/1895 | Germany | 62/381 |
| 516882 | 10/1976 | U.S.S.R. | 62/381 |
| 1541469 | 2/1990 | U.S.S.R. | 62/381 |
| 1278602 | 6/1972 | United Kingdom | 62/381 |

*Primary Examiner*—Christopher Kilner
*Attorney, Agent, or Firm*—Michael Lee; D. W. Rudy; R. C. Kamp

[57] ABSTRACT

The invention provides a rotary cooler with three regions. The regions are separated by baffles with holes, which provide a slowed laminar air flow. Each region has its own recirculation system.

13 Claims, 4 Drawing Sheets

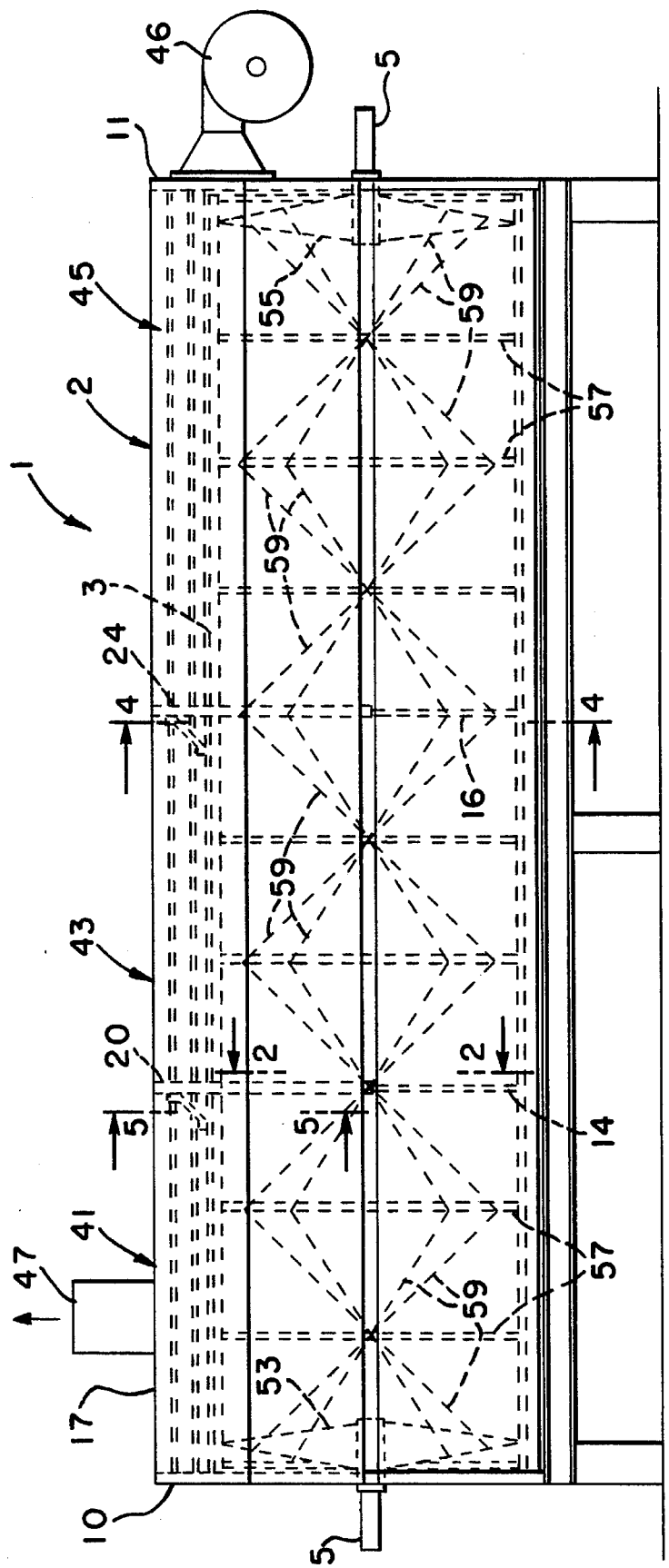

FIG_2
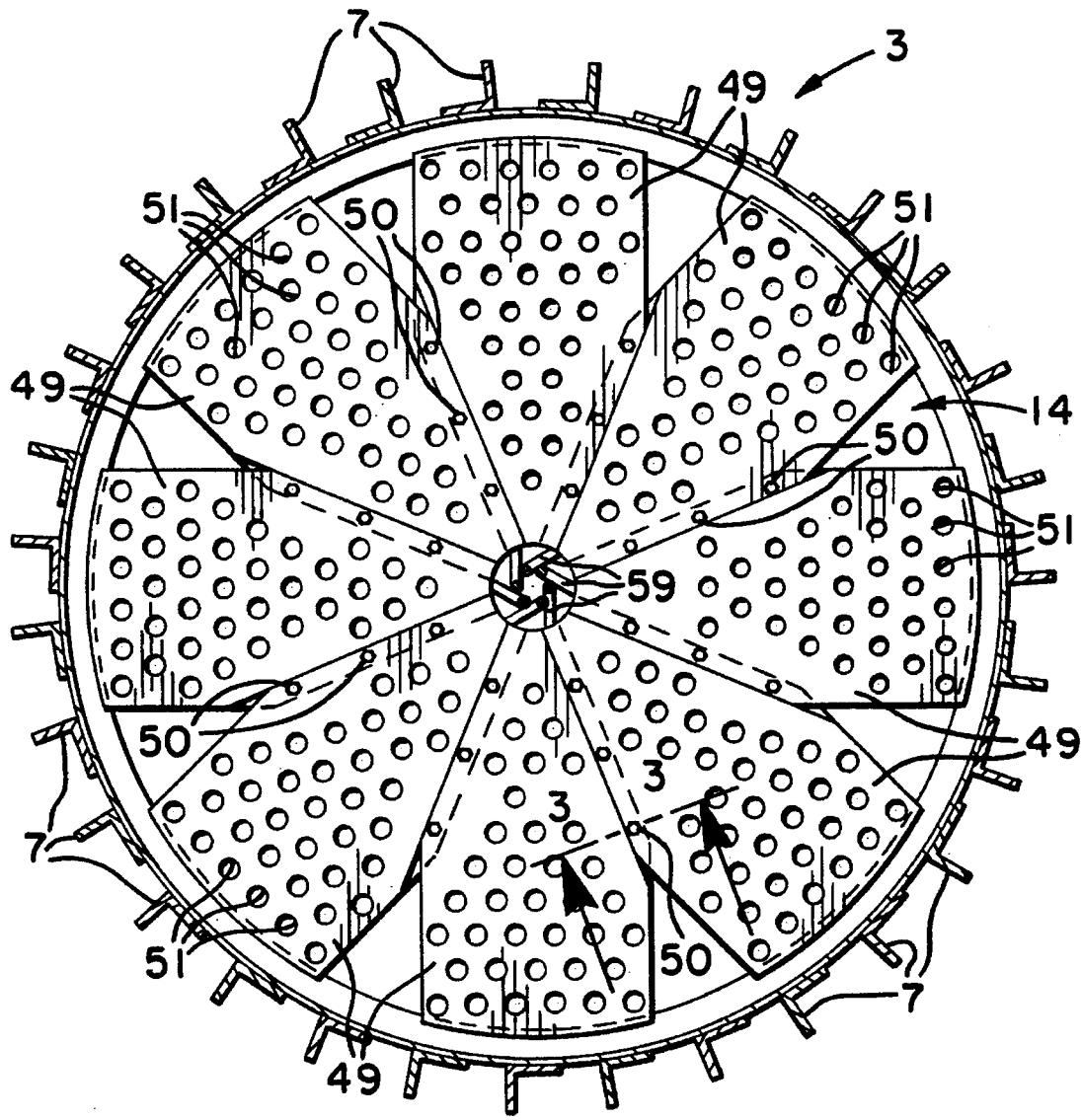
FIG_3
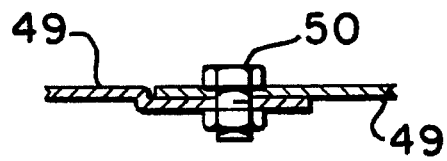

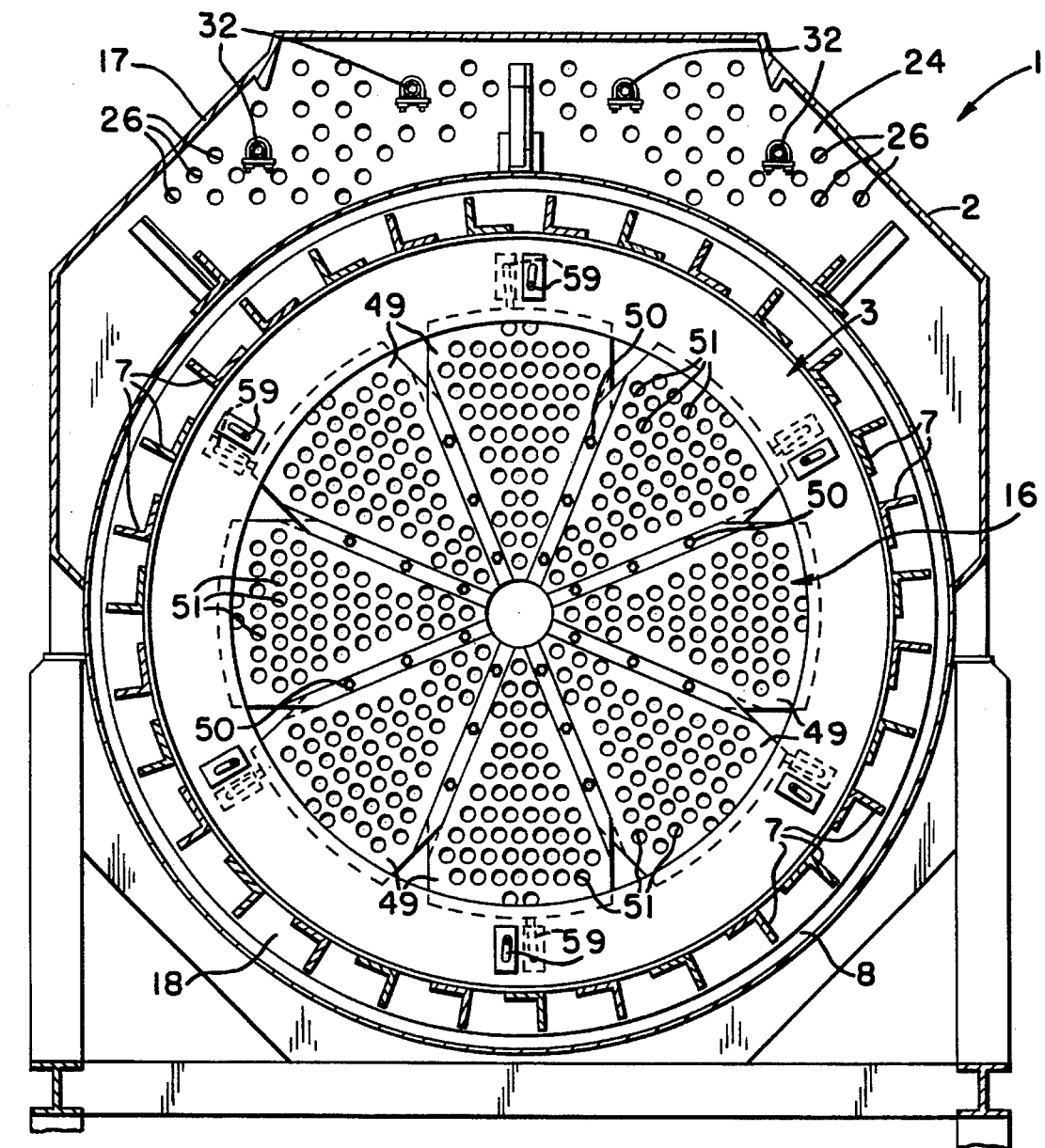
FIG_4
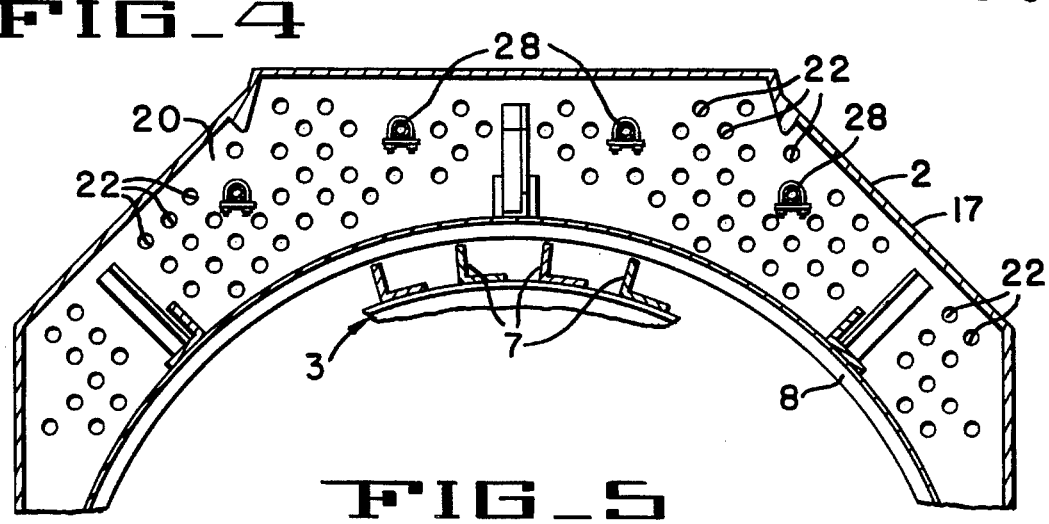
FIG_5

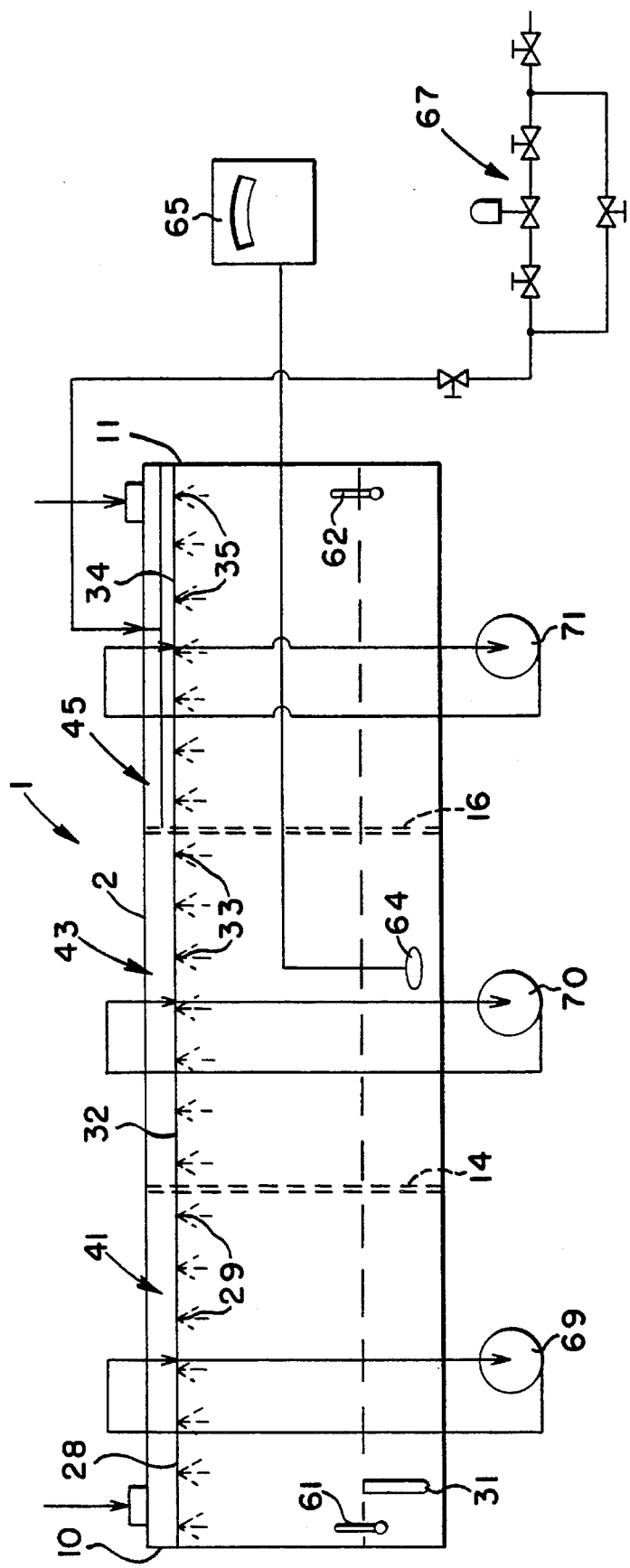
FIG_6

ROTARY COOLING VESSEL WITH BAFFLE WITH HOLES

BACKGROUND OF THE INVENTION

In continuous, rotary pressure sterilizers for containerized foods, at least one vessel (or shell) is used for heating filled containers and a separate vessel is used for cooling the filled containers.

SUMMARY OF THE INVENTION

It is an object of the invention to provide an efficient rotary cooling vessel in a rotary sterilizer or cooker system.

The invention provides a rotary cooling vessel, which has baffles with holes which separate cooling regions and provide a controlled and distributed air flow.

BRIEF DESCRIPTION OF THE DRAWINGS

FIG. 1 is a side view of a cooling vessel.

FIG. 2 is a cross sectional view of the reel in FIG. 1 along lines 2—2.

FIG. 3 is a cross-sectional view of permeable baffles in FIG. 2 along lines 3—3.

FIG. 4 is another cross sectional view of the reel and vessel in FIG. 1 along lines 4—4.

FIG. 5 is a partial cross sectional view of part of the vessel and reel in FIG. 1 along lines 5—5.

FIG. 6 is a schematic view of the cooling vessel, showing the plumbing configuration.

DESCRIPTION OF THE PREFERRED EMBODIMENT

FIG. 1 is a side view of a cooling vessel 1, used in a rotary sterilizer or cooker system. The cooling vessel includes a tubular housing 2 having a rotatable reel 3 therein, which rotates around an axle 5 which is journaled in a first end plate 10 and a second end plate 11 that are secured to the tubular housing 2 in pressure tight engagement. FIG. 2 is a cross-sectional view of the reel 3 shown in FIG. 1 along lines 2—2. FIG. 4 is another cross sectional view of the reel 3 and cooling vessel 1 shown in FIG. 1 along lines 4—4. FIG. 5 is a partial cross sectional view of pan of the cooling vessel 1 and reel 3 shown in FIG. 1 along lines 5—5. The cylindrical housing 2 and the end plates 10, 11 form the cooling vessel 1. A plurality of angle profiles 7 extend the length of the reel 3 parallel to the axis of rotation of the reel 3 on the outer circumference of the reel 3. A T-shaped rail 8 forms a spiral on the inside of the cylindrical housing 2. Between the first end and the second end of the vessel 1 is a first reel barrier wall 14 with apertures 51, which in this embodiment forms a first region 41 between the first reel barrier wall 14 and the first end plate 10. Between the first reel barrier wall 14 and the second end plate 11 is a second reel barrier wall 16 with apertures 51, which in this embodiment forms a second region 43 between the first barrier reel wall 14 and the second barrier reel wall 16. A third region 45 is formed between the second barrier wall and the second end plate 11. Make up water is provided in the third region 45 and flows to and discharged from the first region 41. A blower 46 provides air to the third region 45 which flows to and is discharged from the first region 41, through an exhaust system 47.

The first and second reel barrier walls 14 and 16 are made of perforated plates 49. The perforated plates 49 extend from the sides of the reel 3 to near the center of the reel 3. FIG. 3 is a cross sectional view of perforated plates 49 shown in FIG. 2 along lines 3—3. Bolts 50 are used to mechanically connect the perforated plates 49 together. In other embodiments other mechanical means may be used to mechanically connect the perforated plates 49 together or the perforated plates 49 may be replaced with a single perforated plate extending across the reel 3.

In the preferred embodiment, the axle 5 does not extend completely along the center of the reel 3. The reel is connected to the axle 5, by a first spider 53 near the first end plate 10 and by a second spider 55 near the second end plate 11. The reel is formed by a plurality of rings 57 connected to the angle bars 7, with one ring directly connected to the first spider 53 and one ring connected to the second spider 55. Extending from some of the rings 57 are a plurality of diagonal rods 59, which pass near the center of the reel 3.

In the cooling vessel 1 above the first barrier reel wall 14, is a first vessel barrier wall 20 with apertures 22. The first vessel barrier wall 20 and apertures 22 are formed by a perforated plate, which extends across the top 17 of the cooling vessel 1. In the cooling vessel 1 above the second reel barrier wall 16, is a second vessel barrier wall 24 with apertures 26. The first vessel barrier wall 24 and apertures 26 are formed by a perforated plate, which extends across the top of the cooling vessel 1. In the preferred embodiment, the bottom 18 of the cooling vessel 1 does not have vessel barrier walls.

FIG. 6 is a schematic view of the cooling vessel 1 showing the plumbing configuration. In FIG. 6 a first mercury glass thermometer 61 is placed in the first region 41. A second mercury glass thermometer 62 is placed in the third region 45. A wet bulb 64 is placed in the second region 43 and is electrically connected to a taylor controller 65. A first recirculating pump 69 is in fluid connection between the first region 41 and a first spray bar 28, which is in fluid connection with a first plurality of spray nozzles 29. The first recirculation pump 69 draws water from the first region 41 and provides it to first spray bars 28, which directs the water to the first plurality of spray nozzles 29, which spray the water back into the first region 41. A second recirculating pump 70 is in fluid connection between the second region 43 and second spray bars 32, which is in fluid connection with a second plurality of spray nozzles 33. The second recirculation pump 70 draws water from the second region 43 and provides it to the second spray bar 32, which directs the water to the second plurality of spray nozzles 33, which spray the water back into the second region 43. A cold water supply system 67 is in fluid connection with third spray bars 34, which is in fluid connection with a third plurality of sprayer nozzles 35, which are in the third region 45. A third recirculating pump 71 is in fluid connection between the third region 45 and the third spray bar 34. The third recirculation pump 71 draws water from the third region 45 and provides it to the third spray bar 34, which directs the water to the third plurality of spray nozzles 35.

In operation, cans or other such containers enter the cooling vessel in the first region 41. The angle profiles 7 on the reel 3, which is rotating around the axle 5, push the cans around the outside of the circumference of the reel 3. The T-shaped rail, pushes the rotating cans in the direction from the first region 41 to the third region 45. The cans are discharged from the cooling vessel 1 in the third region 45.

Cold water is added in the third region 45. Make up water is added through the third plurality of spray nozzles 35 located in the third spray bar 34 located overhead the third region 45. Water flows along the bottom 18 of the cooling vessel 1 and is discharged from the vessel 1 in the first region 41 through an overflow tube 31 located in the first region 41. Air is provided to the interior of the vessel 1 at the third region 45 through blower 46 and is exhausted from the first region 41 through the exhaust system 47. As a result, the water and air flow from the third region 45 to the first region 41. Since this is a cooling vessel, the water and air are at a temperature that is lower than the temperature of the cans as they enter the cooling vessel 1. As a result, the water and air heat up as they pass from the third region 45 to the first region 41. The first and second reel barrier walls 14 and 16 provide some resistance to the flow of the water, but the water can flow through the lower portion of the vessel where there is no barrier wall. The first and second reel barrier walls 14 and 16 and the first and second vessel barrier walls 20 and 24 have been perforated to allow a sequential pressure drop at each barrier by providing some resistance, but allowing the air to flow through their apertures 22, 26, and 51. The aperture sizes and spacing are designed to create a desired resistance to create a desired air flow. By slowing the movement of the air to a proper speed, which provides a regional laminar flow, using the baffles with holes, the air is able to increase in humidity as it moves from the third region 45 to the first region 41. An increase in relative humidity means that more water has evaporated into the air, which means increased cooling. Thus properly set apertures, allow for an increased cooling efficiency. As viewed in FIGS. 1 and 6 the cans flow from left to right. The water and air flow from right to left, counter to the flow of the cans.

Evaporative heat removed from the cooling water is expressed as enthalpy per unit mass of dry air. Internal cooling is created by the saturation of the forced air. The cooling effect is, the difference of the final enthalpy of the hot saturated air, minus the enthalpy of the original cooler and drier air. Based on worst condition of a wet bulb temperature air at 72° F. with enthalpy of approximately 36 Btu/lb, and a final bulb temperature of 130° F. with an enthalpy of 156 Btu/lb, the internal cooling effect will be 120 Btu/lb of introduced air.

The first vessel barrier wall provides a first means of providing air resistance to provide a slower air laminar flow. The second vessel barrier wall provides a second means of providing air resistance to provide a slower air laminar flow. Introduction of laminar flowing force air, by the apertures in the barrier walls will allow maximum exposure of the air to the cooling water. Counter flow of air and water to the product in containers will both decrease cooling water temperature as well increase the wet bulb temperature of the air, thus maximizing air enthalpy. Providing the barrier with the desired aperture is essential to the function of the internal cooling. To increase the air/water contact, water is being circulated in each cooling region through the first, second and third recirculation pumps 69, 70, 71 and the first second and third pluralities of spray nozzles 29, 33, 35 with increasing temperature in each consecutive cooling region. Thus gradually raising water content of the air, increasing enthalpy.

In the preferred embodiment, the first reel barrier wall 14 may have a 20% perforation. This 20% perforation is the ratio of the area of the perforations divided by the area of the entire reel barrier wall. The first vessel barrier wall 20 also has a 20% perforation. The second reel barrier wall 16 has a 32% perforation, and the second vessel barrier wall 24 has a 32% perforation. The aperture sizes are 1.5 square inches.

In other embodiments, perforation percentages may range from 15% to 40%. Aperture sizes would be between 0.5 square inches to 4 square inches.

In other embodiments, other substances besides water or mixed with water may be used. In the specification and claims, can may describe any container such as a metal can, a glass jar, or such other containers. Other numbers of barrier zones may be used.

While preferred embodiment of the present invention has been shown and described herein, it will be appreciated that various changes and modifications may be made therein without departing from the spirit of the invention as defined by the scope of the appended claims.

What is claimed is:

1. An apparatus for cooling cans, comprising:

a tubular pressure vessel with a first end wall and a second end wall and a tube extending from the first end wall to the second end wall wherein the tubular pressure vessel has a central cavity with a top and bottom;

a reel within the central cavity and mechanically connected between the first end wall and the second end wall, wherein the reel is able to rotate around a central axis and wherein the reel has outer edges which are displaced furthest from the central axis;

means connected to the outer edges of the reel and extending along the length of the reel for pushing the containers around the reel as the reel is rotated;

a spiral piece on the inside of the central cavity connected to the tubular pressure vessel between the tubular pressure vessel and the reel, and around the reel;

a first reel barrier wall filling an area between the outer edges of the reel and wherein the first barrier wall is between the first end wall and the second end wall, and wherein the region between the first end wall and the first barrier wall forms a first region;

a second reel barrier wall filling an area between the outer edges of the reel and wherein the second barrier wall is between the first barrier wall and the second end wall, wherein the region between the first barrier wall and the second barrier wall forms a second region, and wherein the region between the second barrier wall and the second end wall forms a third region a first means for providing an air resistance and laminar flow, located in the top of the tubular pressure vessel; and a second means for providing an air resistance and laminar flow, located in the top of the tubular pressure vessel.

2. The apparatus for cooling cans, as claimed in claim 1, further comprising:

a fluid drain for draining fluid from the first region of the tubular pressure vessel;

a fluid supply, for supplying fluid to the third region of the tubular pressure vessel;

a first fluid recirculation system for drawing fluid out of the first region and providing the fluid back to the first region;

a second fluid recirculation system for drawing fluid out of the second region and providing the fluid back to the second region; and a third fluid recirculation system for drawing fluid out of the third region and providing the fluid back to the third region.

3. The apparatus for cooling cans, as recited in claim 2, wherein the first means for providing an air resistance and laminar flow comprises a first apertured plate and wherein the second means for providing an air resistance and laminar flow comprises a second apertured plate.

4. The apparatus for cooling cans, as recited in claim 3, wherein the first apertured plate has apertures which make up between 15% to 40% of the area of the plate.

5. The apparatus for cooling cans as recited in claim 4, wherein the apertures are between 0.5 and 4 square inches.

6. The apparatus for cooling cans, as recited in claim 3, wherein the first apertured plate has apertures which make up 20% of the area of the plate.

7. The apparatus for cooling cans, as recited in claim 2, further comprising:

means for providing cans to the tubular pressure vessel located in the first region of the tubular pressure vessel; and means for removing cans from the tubular pressure vessel located in the third region of the tubular pressure vessel, wherein the cans are moved in the pressure vessel from the first region to the third region.

8. The apparatus for cooling cans, as recited in claim 7, further comprising:

a blower located in the third region of the tubular pressure vessel; and an air exhaust system located in the first region of the tubular pressure vessel.

9. A method for cooling cans, comprising the steps of:

introducing cans in a first end of the pressure vessel;

moving the cans around the periphery of a reel in the pressure vessel;

moving the cans from the first end to a second end of the pressure vessel;

introducing a liquid coolant near the second end of the pressure vessel;

draining the liquid fluid near the first end of the pressure vessel;

blowing air into the second end of the pressure vessel;

providing resistance to the flow of the air as it passes from the second end of the pressure vessel to the first end of the pressure vessel, wherein the step of providing resistance, comprises the step of producing a laminar flow of air; and exhausting air from the first end of the pressure vessel.

10. An apparatus for cooling cans, comprising:

a tubular pressure vessel with a first end and a second end and a tube extending from the first end to the second end wherein the tubular pressure vessel has a central cavity with a top and bottom;

a reel within the central cavity and mechanically connected between the first end of the pressure vessel and the second end of the pressure vessel, wherein the reel is able to rotate around a central axis and wherein the reel has outer edges which are displaced furthest from the central axis;

means connected to the outer edges of the reel and extending along the length of the reel for pushing the containers around the reel as the reel is rotated;

means for introducing cans into the pressure vessel at the first end of the pressure vessel;

means for removing cans from the pressure vessel at the second end of the pressure vessel;

means for moving the cans in the direction from the first end of the pressure vessel to the second end of the pressure vessel;

means for introducing liquid coolant into at the second end of the pressure vessel;

means for draining the liquid coolant from the first end of the pressure vessel;

means for blowing air into the second end of the pressure vessel;

means for providing resistance to the air flow from the second end of the pressure vessel to the first end of the pressure vessel, wherein the means for providing resistance comprises perforated plates; and means for exhausting air from the first end of the pressure vessel.

11. The apparatus, as recited in claim 10, wherein the perforated plates has apertures which make up between 15% to 40% of the area of the plate.

12. The apparatus, as recited in claim 11, wherein the apertures are between 0.5 and 4 square inches.

13. The apparatus, as recited in claim 10, wherein the perforated plates has apertures which make up 20% of the area of the plate.

* * * * *